(12) United States Patent
Kuwayama et al.

(10) Patent No.: US 12,420,597 B2
(45) Date of Patent: Sep. 23, 2025

(54) TIRE, RETREADED TIRE, AND RETREADED TIRE PRODUCTION METHOD

(71) Applicant: BRIDGESTONE CORPORATION, Tokyo (JP)

(72) Inventors: Isao Kuwayama, Tokyo (JP); Takashi Shimura, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/564,158

(22) PCT Filed: Nov. 17, 2021

(86) PCT No.: PCT/JP2021/042335
§ 371 (c)(1),
(2) Date: Nov. 27, 2023

(87) PCT Pub. No.: WO2023/276184
PCT Pub. Date: Jan. 5, 2023

(65) Prior Publication Data
US 2024/0246364 A1     Jul. 25, 2024

(30) Foreign Application Priority Data

Jun. 30, 2021  (JP) .................................. 2021-109737

(51) Int. Cl.
*B60C 19/00* (2006.01)
*B29D 30/54* (2006.01)
*B60C 11/02* (2006.01)

(52) U.S. Cl.
CPC .............. *B60C 19/00* (2013.01); *B29D 30/54* (2013.01); *B60C 11/02* (2013.01); *B60C 2019/004* (2013.01)

(58) Field of Classification Search
CPC ... B60C 19/00; B60C 2019/004; B60C 11/02; B60C 23/0433; B60C 23/0493; B29D 2030/546; G06K 19/07764
See application file for complete search history.

(56) References Cited

U.S. PATENT DOCUMENTS 10,460,226 B2   10/2019  Wei et al.
11,400,769 B2    8/2022  Ohta
(Continued)

FOREIGN PATENT DOCUMENTS

EP          0505906 A1      9/1992
EP          1384602 A1 *    1/2004  ........... H01Q 1/2241
(Continued)

OTHER PUBLICATIONS

Dec. 14, 2023, International Preliminary Report on Patentability issued in the International Patent Application No. PCT/JP2021/042335.
(Continued)

*Primary Examiner* — Robert C Dye
(74) *Attorney, Agent, or Firm* — KENJA IP LAW PC

(57) ABSTRACT

A tire comprises: a belt composed of one or more belt layers; a main groove on a tread surface; and a communication device embedded at a position that is inward in a tire radial direction from a groove bottom of the main groove, outward in the tire radial direction from an inner surface of an innermost belt layer in the belt, and outward in a tire width direction from a minimum width belt layer in the belt, wherein a tire radial outer side of the communication device is not covered with the belt.

3 Claims, 4 Drawing Sheets

(56) References Cited

U.S. PATENT DOCUMENTS

| | | | |
|---|---|---|---|
| 2007/0215260 A1 | 9/2007 | Kleckner | |
| 2013/0204752 A1 | 8/2013 | Damon | |
| 2013/0218699 A1 | 8/2013 | Damon | |
| 2015/0246583 A1* | 9/2015 | Stuckey | B60C 11/02 152/209.1 |
| 2016/0325517 A1* | 11/2016 | Westaway | B29D 30/56 |
| 2017/0357887 A1 | 12/2017 | Wei et al. | |
| 2017/0361661 A1* | 12/2017 | Wei | B60C 11/24 |
| 2020/0108669 A1* | 4/2020 | Nakamura | B60C 19/00 |
| 2020/0148016 A1* | 5/2020 | Nagayoshi | G06K 19/07764 |
| 2020/0164605 A1 | 5/2020 | Yoshida | |
| 2020/0398615 A1 | 12/2020 | Ohta | |

FOREIGN PATENT DOCUMENTS

| | | |
|---|---|---|
| EP | 3739519 A1 | 11/2020 |
| JP | 2004013399 A | 1/2004 |
| JP | 6025872 B2 | 11/2016 |
| JP | 2018505088 A | 2/2018 |
| JP | 2020079041 A | 5/2020 |
| JP | 2020083044 A | 6/2020 |
| JP | 2021000854 A | 1/2021 |
| JP | 2021000855 A | 1/2021 |
| JP | 2021044674 A | 3/2021 |
| WO | 2019207422 A1 | 10/2019 |

OTHER PUBLICATIONS

Feb. 1, 2022, International Search Report issued in the International Patent Application No. PCT/JP2021/042335.

Oct. 11, 2024, search result of the Extended European Search Report issued by the European Patent Office in the corresponding European Patent Application No. 21948487.0.

* cited by examiner

TIRE, RETREADED TIRE, AND RETREADED TIRE PRODUCTION METHOD

TECHNICAL FIELD

The present disclosure relates to a tire, a retreaded tire, and a retreaded tire production method.

BACKGROUND

A structure in which a communication device such as an RFID tag is embedded in a tire is known. For example, JP 2018-505088 A (PTL 1) discloses a tire in which an RFID tag is provided between a plurality of components of the tire.

CITATION LIST

Patent Literature

PTL 1: JP 2018-505088 A

SUMMARY

Technical Problem

There is, however, still a need for further improvement in the usefulness of tires. For example, there is a need to embed, in a tire, a communication device at such a position that takes into account retreading of the tire.

It could therefore be helpful to provide a tire and retreaded tire with improved usefulness and a retreaded tire production method for the same.

Solution to Problem

A tire according to the present disclosure comprises: a belt composed of one or more belt layers; a main groove on a tread surface; and a communication device embedded at a position that is inward in a tire radial direction from a groove bottom of the main groove, outward in the tire radial direction from an inner surface of an innermost belt layer in the belt, and outward in a tire width direction from a minimum width belt layer in the belt, wherein a tire radial outer side of the communication device is not covered with the belt.

A retreaded tire according to the present disclosure comprises: a base tire that includes a belt composed of one or more belt layers and is obtained as a result of removing a tire radial outer part from a position that is outward in a tire radial direction from an outer surface of an outermost belt layer in the belt; a communication device embedded in the base tire at a position that is outward in the tire radial direction from an inner surface of an innermost belt layer in the belt and outward in a tire width direction from a minimum width belt layer in the belt; and a tread member adhered to a tire radial outer side of the base tire, wherein a tire radial outer side of the communication device is not covered with the belt.

A retreaded tire production method according to the present disclosure is a retreaded tire production method of obtaining a retreaded tire in which a communication device is embedded, the retreaded tire production method comprising: removing, from a tire including a belt composed of one or more belt layers, a tire radial outer part from a position that is outward in a tire radial direction from an outer surface of an outermost belt layer in the belt to produce a base tire; installing a communication device in the base tire at a position that is outward in the tire radial direction from an inner surface of an innermost belt layer in the belt and outward in a tire width direction from a minimum width belt layer in the belt so that a tire radial outer side of the communication device will not be covered with the belt; and adhering a tread member to the base tire from a tire radial outer side of the base tire.

Advantageous Effect

It is thus possible to provide a tire and retreaded tire with improved usefulness and a retreaded tire production method for the same.

DETAILED DESCRIPTION

Figure 1:
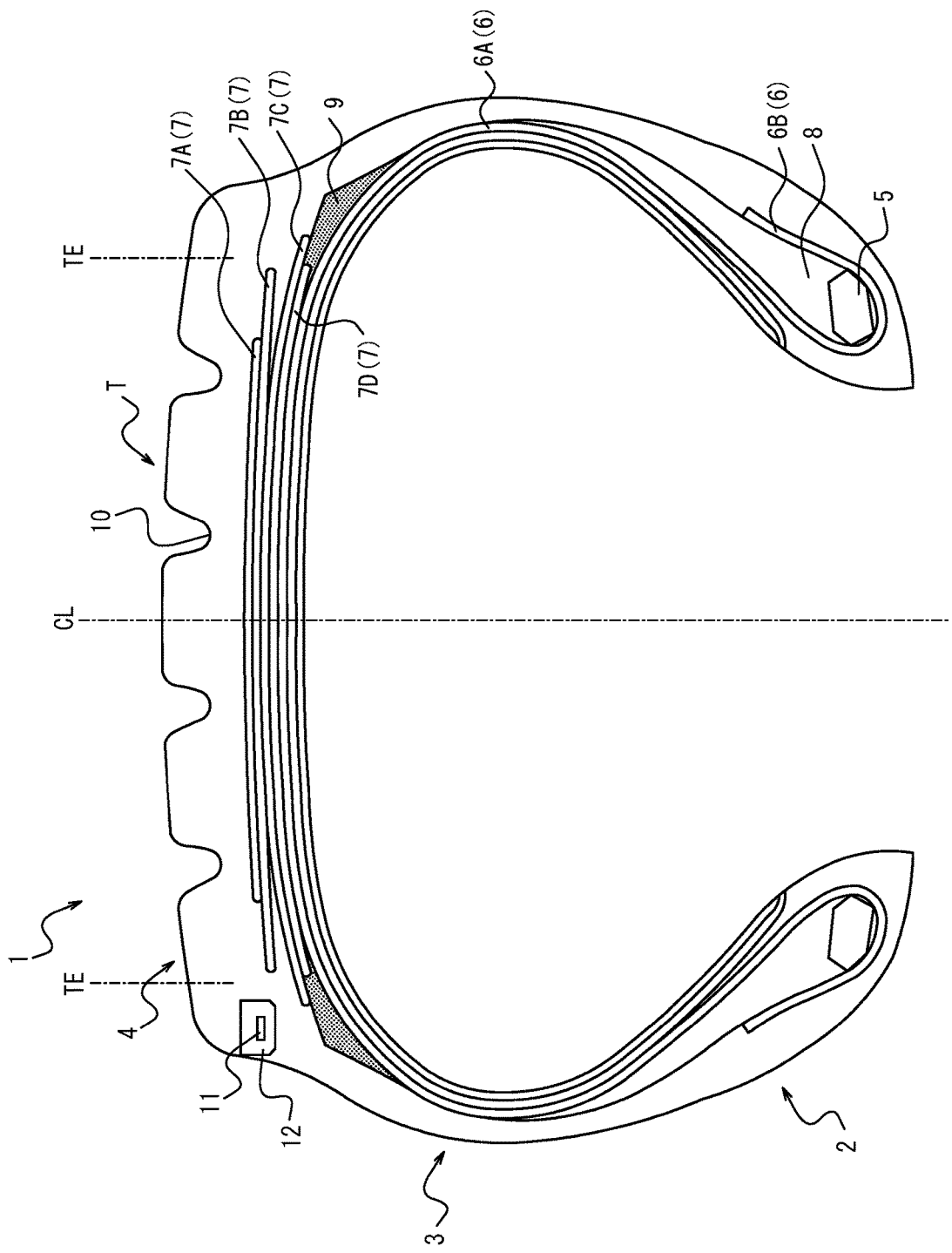
FIG. 1 is a cross-sectional view in the tire width direction of a tire according to an embodiment of the present disclosure.

An embodiment of a tire according to the present disclosure will be described below with reference to the drawings. Common members and parts in the drawings are given the same reference signs. The drawings are schematic and the ratios of dimensions and the like may differ from the actual ones.

In this specification, a "tire" may be a tire that has never been retreaded or a tire that has been retreaded one or more times. In this specification, a tire that has been retreaded one or more times is also referred to as "retreaded tire" to distinguish it from a tire that has never been retreaded.

In this specification, the "tire width direction" denotes a direction parallel to the rotation axis of the tire, the "tire radial direction" denotes a direction orthogonal to the rotation axis of the tire, and the "tire circumferential direction" denotes a direction in which the tire rotates around the rotation axis of the tire.

In this specification, the "tire radial inner side" denotes the side closer to the rotation axis of the tire in the tire radial direction, and the "tire radial outer side" denotes the side farther from the rotation axis of the tire in the tire radial direction. Moreover, the "tire widthwise inner side" denotes the side closer to the tire equatorial plane CL in the tire width direction, and the "tire widthwise outer side" denotes the side farther from the tire equatorial plane CL in the tire width direction.

In this specification, the positional relationship between the elements of the tire is measured in a reference state, unless otherwise specified. The "reference state" is a state in which the tire is attached to a rim of a wheel, which is an applicable rim, filled to a prescribed internal pressure, and placed under no load.

The contact patch that contacts the road surface in a state in which the tire is attached to a rim of a wheel, which is an applicable rim, filled to a prescribed internal pressure, and placed under a prescribed load is referred to as a tread surface T. Both ends in the tire width direction of the contact patch that contacts the road surface in a state in which the tire is attached to a rim of a wheel, which is an applicable rim, filled to a prescribed internal pressure, and placed under a prescribed load are referred to as tread edges TE. In the following description, it is assumed that the tire has its inner cavity filled with air and is mounted on a vehicle such as a truck or a bus. However, the inner cavity of the tire may be filled with a fluid other than air, and the tire may be mounted on a vehicle other than a truck or a bus.

In this specification, the "applicable rim" is an approved rim ("measuring rim" in ETRTO (European Tyre and Rim Technical Organization) Standards Manual, "design rim" in TRA (Tire and Rim Association, Inc.) Year Book) in applicable size that is described or will be described in the future in an effective industrial standard in areas where tires are produced and used, such as JATMA (Japan Automobile Tyre Manufacturers Association) Year Book in Japan, ETRTO Standards Manual in Europe, or TRA Year Book in the United States. In the case of a size not described in the industrial standard, the "applicable rim" denotes a rim whose width corresponds to the bead width of the tire. The "applicable rim" includes not only current size but also a size that may be included in the industrial standard in the future. An example of the "size that will be described in the future" is the size described as "future developments" in ETRTO Standards Manual 2013.

In this specification, the "prescribed internal pressure" denotes the air pressure (maximum air pressure) corresponding to the maximum load capability of a single wheel in applicable size and ply rating described in the industrial standard such as JATMA Year Book. In the case of a size not described in the industrial standard, the "prescribed internal pressure" denotes the air pressure (maximum air pressure) corresponding to the maximum load capability defined for each vehicle on which the tire is mounted. In this specification, the "prescribed load" denotes the load corresponding to the maximum load capability of a single wheel in applicable size and ply rating described in the industrial standard. In the case of a size not described in the industrial standard, the "prescribed load" denotes the load corresponding to the maximum load capability defined for each vehicle on which the tire is mounted.

A tire 1 according to an embodiment of the present disclosure will be described below with reference to the drawings.

FIG. 1 is a cross-sectional view of the tire 1 according to an embodiment of the present disclosure, taken along the tire width direction. FIG. 1 illustrates the tire 1 in the reference state in which the tire 1 is attached to a rim R of a wheel, which is the applicable rim, filled to the prescribed internal pressure, and placed under no load.

The tire 1 includes a pair of bead portions 2, a pair of sidewall portions 3, and a tread portion 4. Each sidewall portion 3 extends between the tread portion 4 and the corresponding bead portion 2. A communication device 11 is embedded in the tire 1, which will be described in detail later.

Although this embodiment describes the case where the tire 1 is symmetrical with respect to the tire equatorial plane CL except for the communication device 11 embedded in the tire 1 and a rubber member 12 in which the communication device 11 is embedded, the tire 1 may be asymmetrical with respect to the tire equatorial plane CL.

The tire 1 includes a pair of bead cores 5 located in the bead portions 2, a carcass 6 composed of one or more plies toroidally extending between the pair of bead cores 5, and a belt 7 composed of one or more belt layers located on the tire radial outer side of the crown region of the carcass 6.

Each bead core 5 is composed of an annular cable bead extending in the tire circumferential direction. In this embodiment, the cross-sectional shape of the bead core 5 in a plane orthogonal to its extending direction (cross-sectional shape in the tire width direction) is hexagonal or approximately hexagonal. The cross-sectional shape of the bead core 5 in the tire width direction may be, however, any shape such as a circle or a quadrangle. The cable bead is formed by coating a high carbon steel wire with rubber, for example. A bead filler 8 made of a rubber material or the like is provided on the tire radial outer side of the bead core 5.

The carcass 6 is composed of one or more plies (one ply in this embodiment) toroidally extending between the pair of bead cores 5. The ply is formed by coating an organic fiber cord such as a nylon cord with rubber, for example. The ends of the carcass 6 are locked by the bead cores 5. Specifically, the carcass 6 includes a carcass body portion 6A located between the bead cores 5, and carcass folded portions 6B each folded back from inside to outside in the tire width direction around the corresponding bead core 5. The carcass folded portion 6B may have any length. The carcass 6 may have a structure in which the carcass folded portion 6B is folded back from outside to inside in the tire width direction around the bead core 5 or a structure in which the carcass folded portion 6B is wound around the bead core 5, or may include no carcass folded portion 6B.

The belt 7 is located on the tire radial outer side of the crown region of the carcass 6. The belt 7 is composed of one or more belt layers laminated in the tire radial direction in the tire equatorial plane CL.

In this embodiment, the belt 7 is composed of four belt layers 7A to 7D. More specifically, the four belt layers 7A to 7D are arranged in this order from the tire radial outer side. A belt under-cushion rubber 9 is located on the widthwise outer side of the belt layer 7D.

In this specification, the belt layer located outermost in the tire radial direction is referred to as "outermost belt layer". The belt layer 7A is the outermost belt layer in this embodiment. The belt layer located innermost in the tire radial direction is referred to as "innermost belt layer". The belt layer 7D is the innermost belt layer in this embodiment. The belt layer longest in the tire width direction is referred to as "maximum width belt layer". The belt layer 7C is the maximum width belt layer in this embodiment. The belt layer shortest in the tire width direction is referred to as "minimum width belt layer". The belt layer 7A is the minimum width belt layer in this embodiment. One belt layer may correspond to two or more of the outermost belt layer, the innermost belt layer, the maximum width belt layer, and the minimum width belt layer. For example, in the case where the belt 7 is composed of one belt layer, the one belt layer constituting the belt 7 corresponds to all of the outermost belt layer, the innermost belt layer, the maximum width belt layer, and the minimum width belt layer.

The belt 7 may be made of a material that does not interfere with wireless communication of the communication device 11. In this embodiment, the belt 7 is a non-metal belt. Specifically, the belt cords included in each of the belt layers 7A to 7D constituting the belt 7 are made of a non-metal material. The non-metal material may be, for example, a material such as glass or plastic. A decrease in the communicability of the communication device 11 caused by embedding the communication device 11 near the belt 7 can thus be prevented. Hence, the communication device 11 can be embedded in a part with little distortion near the belt 7. Alternatively, the belt 7 may be a metal belt including, for example, a steel cord.

At least one main groove is provided on the tread surface T of the tread portion 4. In this specification, the main groove is a groove whose groove bottom is located innermost in the tire radial direction out of the one or more grooves provided on the tread surface T. In this embodiment, four circumferential main grooves 10 extending in the tire circumferential direction are provided on the tread surface T as main grooves. The number of main grooves may be, however, any number. Moreover, the main grooves are not limited to circumferential grooves.

The tire 1 is provided with the communication device 11.

The communication device 11 performs wireless communication. For example, the communication device 11 is a radio frequency (RF) tag. The RF tag is also referred to as a radio frequency identification (RFID) tag. The communication device 11 includes an integrated circuit (IC) chip including a controller and a storage, and one or more antennas connected to the IC chip. The IC chip may store any information about the tire 1, such as the identification information and manufacturing date of the tire 1 or the number of times the tire 1 has been retreaded. For example, the communication device 11 may have a long shape as a whole, with two linearly, wavily, or spirally extending antennas extending in opposite directions from the IC chip. The communication device 11 may be embedded in the tire 1 so that the longitudinal direction of the communication device 11 will be approximately parallel to the circumferential direction of the tire 1. Each antenna, however, may have any shape and may be located within the IC chip.

The IC chip may be operated by induced electromotive force generated by electromagnetic waves received by the one or more antennas. That is, the communication device 11 may be a passive type communication device. Alternatively, the communication device 11 may further include a battery and be capable of communication by generating electromagnetic waves using its own power. That is, the communication device 11 may be an active type communication device.

Figure 2:
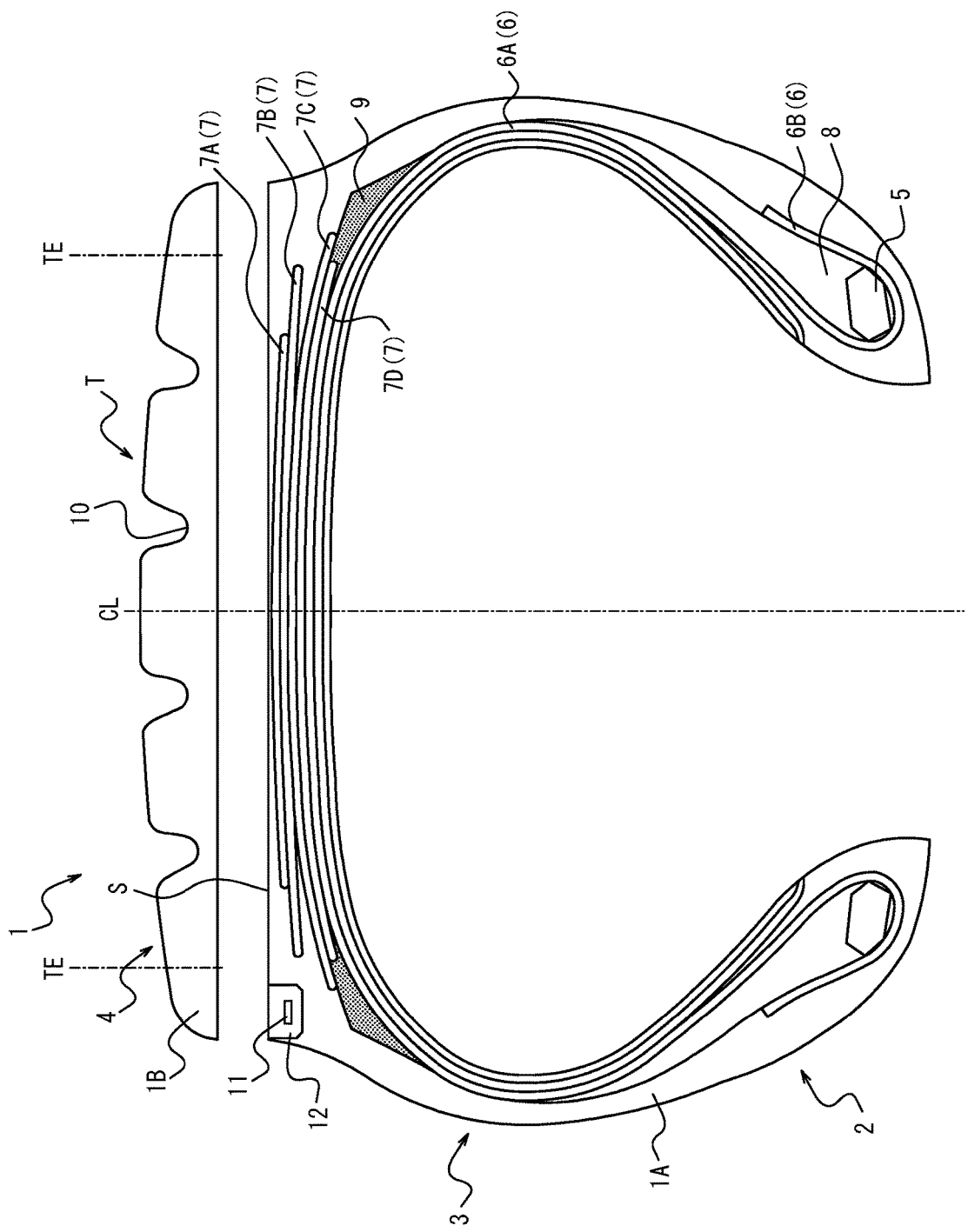
FIG. 2 is a cross-sectional view in the tire width direction of the tire illustrated in FIG. 1 in a state in which a base tire and a tread member are separated during retreading.

The communication device 11 is embedded at a position that is inward in the tire radial direction from the groove bottom of the circumferential main groove 10 and outward in the tire radial direction from the inner surface of the innermost belt layer 7D in the belt 7. In this specification, the "inner surface" of each of the belt layers 7A to 7D denotes the surface of the belt layer on the tire radial inner side. Accordingly, when the tire 1 is retreaded, the communication device 11 is not cut off and remains in the base tire 1A as illustrated in FIG. 2, so that the communication device 11 can be continuously used. FIG. 2 is a cross-sectional view in the tire width direction of the tire 1 illustrated in FIG. 1 in a state in which the base tire 1A and the tread member 1B are separated during retreading.

Moreover, the communication device 11 is embedded at a position that is outward in the tire width direction from the minimum width belt layer 7A in the belt 7. Thus, when the communication device 11 communicates with an electronic device installed outward in the tire width direction from the communication device 11, the belt 7 is less likely to interfere with the communication of the communication device 11.

For example, the communication device 11 may store "the number of times the tire 1 has been retreaded". By updating "the number of times the tire 1 has been retreaded" stored in the communication device 11 through wireless communication when the tire 1 is retreaded, the communication device 11 can continue to store "the number of times the tire 1 has been retreaded". Furthermore, embedding the communication device 11 near the surface S of the base tire 1A on the tire radial outer side, which is exposed during retreading of the tire 1, allows the communication device 11 to be easily extracted from the base tire 1A during retreading of the tire 1. This improves the maintainability of the communication device 11 in the event of failure of the communication device 11.

Referring again to FIG. 1, the tire radial outer side of the communication device 11 is not covered with the belt 7. Thus, when the communication device 11 communicates with an electronic device installed outward in the tire radial direction from the communication device 11, the belt 7 is less likely to interfere with the communication of the communication device 11. Moreover, the belt 7 is less likely to hinder embedding the communication device in the base tire 1A or extracting the communication device from the base tire 1A during retreading of the tire 1. Alternatively, the tire radial outer side of the communication device 11 may be covered with at least one of the belt layers 7A to 7D in the belt 7. Thus, the communication device 11 is less likely to be damaged even in the case where a foreign object such as a nail gets stuck in the tire 1 when the vehicle is running.

In this embodiment, the communication device 11 may be embedded at a position that is outward in the tire radial direction from the inner surface of the maximum width belt layer 7C in the belt 7. Thus, the belt 7 is less likely to hinder embedding the communication device 11 in the base tire 1A or extracting the communication device 11 from the base tire 1A during retreading of the tire 1.

The communication device 11 may be embedded at a position that is inward in the tire radial direction from the outer surface of the outermost belt layer 7A in the belt 7. In this specification, the "outer surface" of each of the belt layers 7A to 7D denotes the surface of the belt layer on the tire radial outer side. Hence, when the tread member 1B is removed from the tire 1 by a polishing device during retreading of the tire 1, the outermost belt layer 7A located outward in the tire radial direction from the communication device 11 can prevent the polishing device from reaching the communication device 11. The communication device 11 is therefore less likely to be damaged.

The communication device 11 may be embedded at a position that is outward in the tire width direction from the maximum width belt layer 7C in the belt 7. Thus, when the communication device 11 communicates with an electronic device installed outward in the tire width direction from the communication device 11, the belt 7 is less likely to interfere with the communication of the communication device 11. The communicability of the communication device 11 in both the tire radial direction and the tire width direction can therefore be achieved.

The communication device 11 may be embedded at a position that is outward in the tire width direction from the tread edge TE. As a result of the communication device 11 being located at such a position that is away from the tread surface T which contacts the road surface and therefore is highly likely to have a foreign object such as a nail stuck therein, the probability of damage of the communication device 11 can be reduced.

Figure 3:
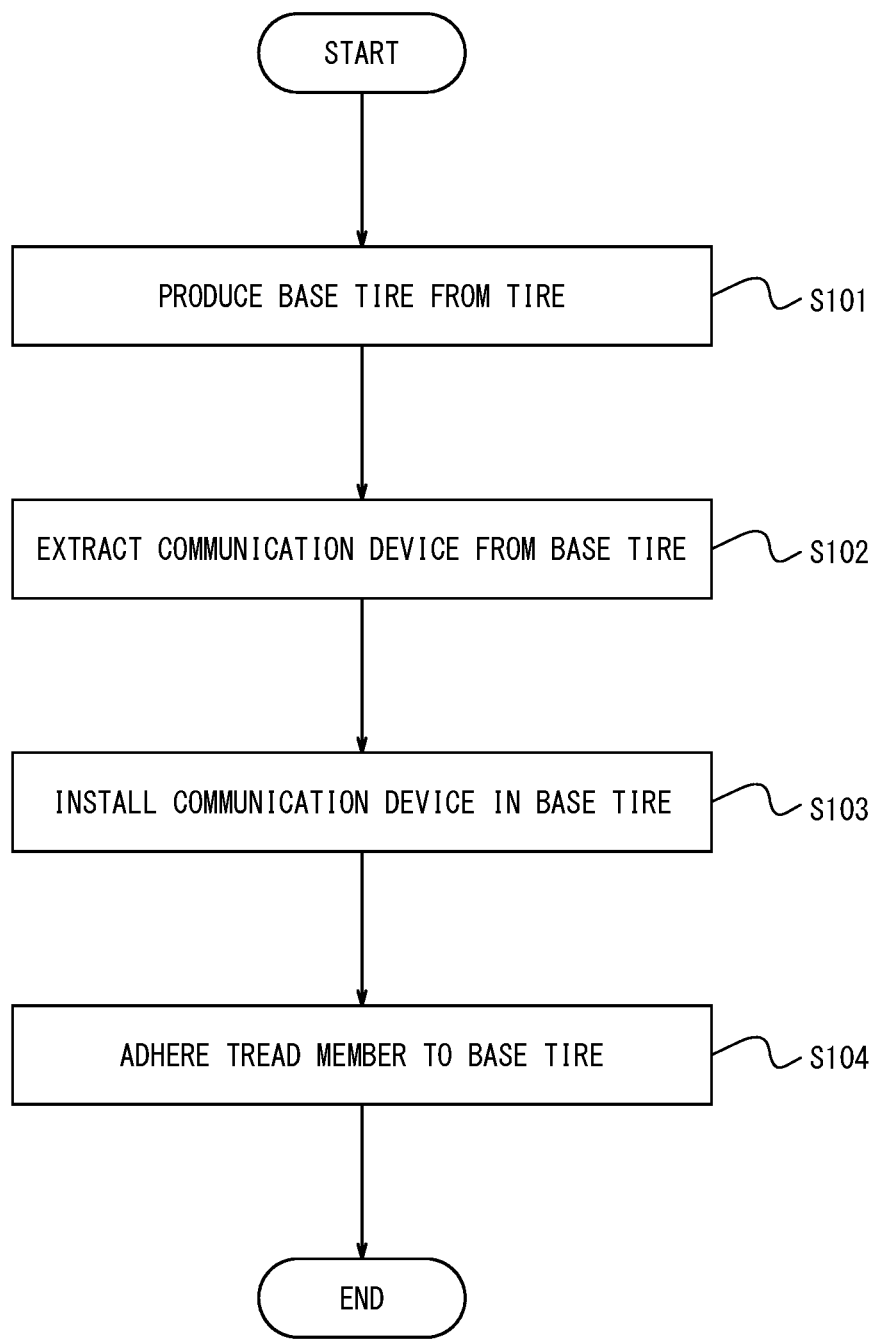
FIG. 3 is a flowchart illustrating a retreaded tire production method according to an embodiment of the present disclosure.
Figure 4:
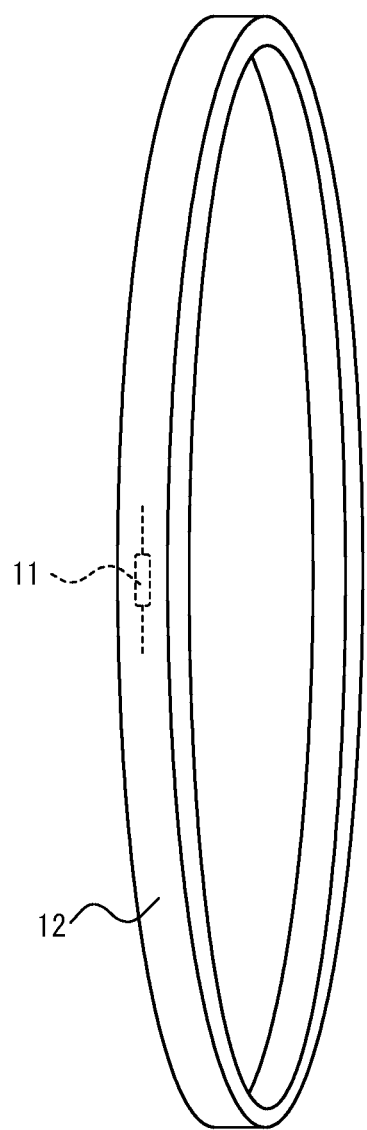
FIG. 4 is a schematic view of a rubber member in which a communication device is embedded.

A production method for the retreaded tire 1 according to an embodiment of the present disclosure will be described below, with reference to FIGS. 2, 3, and 4. FIG. 3 is a flowchart illustrating a production method for the retreaded tire 1 according to an embodiment of the present disclosure. FIG. 4 is a schematic view of the rubber member 12 in which the communication device 11 is embedded. In the following description of the production method, it is assumed that, when retreading the tire 1 in which the communication device 11 is embedded in advance, the communication device 11 is extracted from the tire 1, a new communication device 11 is embedded, and a retreaded tire 1 in which the new communication device 11 is embedded is produced. However, the production method may be used to, when retreading the tire 1 in which the communication device 11 is not embedded, embed the communication device 11 and produce a retreaded tire 1 in which the communication device 11 is embedded. Alternatively, the production method may be used to retread the tire 1 in which the communication device 11 is embedded while leaving the communication device 11 in the tire 1 and produce a retreaded tire 1 in which the communication device 11 is embedded.

Step S101: From the tire 1 including the belt 7 composed of one or more belt layers 7A to 7D, a tire radial outer part is removed from a position that is outward in the tire radial direction from the outer surface of the outermost belt layer 7A in the belt 7 to produce the base tire 1A.

Specifically, the tread rubber is polished (buffed) from the tire radial outer side to a predetermined position in the tire 1 using a polishing device to produce the base tire 1A. The communication device 11 is embedded in the tire 1 at a position that is inward in the tire radial direction from the predetermined position. The predetermined position is a position within the range that is inward in the tire radial direction from the groove bottom of the circumferential main groove 10 provided on the tread surface T of the tread portion 4 and is outward in the tire radial direction from the outer surface of the outermost belt layer 7A in the belt 7.

Step S102: The communication device 11 is extracted from the base tire 1A.

Specifically, the communication device 11 embedded in the base tire 1A is extracted from the surface S of the base tire 1A on the tire radial outer side using an extraction device. In this embodiment, the communication device 11 is extracted together with the rubber located around the communication device 11. Alternatively, only the communication device 11 may be extracted. The extracted communication device 11 is repaired or replaced with a new communication device 11. In the case where the communication device 11 is operating normally, steps S102 and S103 may be omitted.

Step S103: The communication device 11 is installed in the base tire 1A at a position that is outward in the tire radial direction from the inner surface of the innermost belt layer 7D in the belt 7 and outward in the tire width direction from the minimum width belt layer 7A in the belt 7 so that the tire radial outer side of the communication device 11 will not be covered with the belt 7.

In this embodiment, the communication device 11 is embedded in part of the annular rubber member 12 extending in the tire circumferential direction, as illustrated in FIG. 4. The rubber member 12 in which the communication device 11 is embedded is wound around the base tire 1A from the tire radial outer side of the base tire 1A using an attachment device. Here, the rubber member 12 may be placed in the part of the surface S of the base tire 1A on the tire radial outer side where rubber has been removed when extracting the communication device 11 from the base tire 1A. Preparing the rubber member 12 in which the communication device 11 is embedded in advance in this way enables stable placement of the communication device 11 in the base tire 1A, with it being possible to improve the productivity of the retreaded tire 1. The rubber member 12 may be band-shaped instead of annular. The communication device 11 not embedded in the rubber member 12 may be installed in the base tire 1A.

The rubber material forming the rubber member 12 may be the same rubber material as the rubber material located around the rubber member 12 in the base tire 1A. This facilitates adhesion between the base tire 1A and the rubber member 12 during vulcanization. Alternatively, the rubber material forming the rubber member 12 may be a highly conductive rubber material lower in carbon content than the rubber material located around the rubber member 12 in the base tire 1A. In this way, the communicability of the communication device 11 embedded in the retreaded tire 1 can be improved.

Step S104: The tread member 1B is adhered to the base tire 1A from the tire radial outer side of the base tire 1A.

In this embodiment, the tread member 1B is vulcanized before being adhered to the base tire 1A in order to ease the adhesion to the base tire 1A. This production method is a pre-cure production method (pre-curing). Alternatively, the tread member 1B may be unvulcanized. That is, the production method may be a remold production method. An adhesive rubber is placed on the surface S of the base tire 1A on the tire radial outer side and the tread member 1B is attached using an attachment device.

After this, the base tire 1A to which the tread member 1B is attached via the adhesive rubber is vulcanized using a vulcanizing device (for example, a vulcanizing can) to adhere the tread member 1B to the base tire 1A.

With this production method, the retreaded tire 1 in which the communication device 11 is embedded can be obtained. More specifically, with this production method, it is possible to obtain the retreaded tire 1 including: the base tire 1A that includes the belt 7 composed of one or more belt layers 7A to 7D and is obtained as a result of removing a tire radial outer part from a position that is outward in the tire radial direction from the outer surface of the outermost belt layer 7A in the belt 7; the communication device 11 embedded in the base tire 1A at a position that is outward in the tire radial direction from the inner surface of the innermost belt layer 7D in the belt 7 and outward in the tire width direction from the minimum width belt layer 7A in the belt 7; and the tread member 1B adhered to the tire radial outer side of the base tire 1A. In the retreaded tire 1, the tire radial outer side of the communication device 11 is not covered with the belt 7.

As described above, the tire 1 according to an embodiment of the present disclosure comprises: the belt 7 composed of one or more belt layers 7A to 7D; a main groove (circumferential main groove 10) on the tread surface T; and the communication device 11 embedded at a position that is inward in the tire radial direction from the groove bottom of the main groove (circumferential main groove 10), outward in the tire radial direction from the inner surface of the innermost belt layer 7D in the belt 7, and outward in the tire width direction from the minimum width belt layer 7A in the belt 7, wherein the tire radial outer side of the communication device 11 is not covered with the belt 7. With this structure, when the tire 1 is retreaded, the communication device 11 is not cut off, so that the communication device 11 can be continuously used. Moreover, when the tire 1 is retreaded, the belt 7 is less likely to hinder embedding the communication device 11 in the tire 1 or extracting the communication device 11 from the tire 1. Furthermore, embedding the communication device 11 near the surface S of the base tire 1A on the tire radial outer side, which is exposed during retreading of the tire 1, improves the maintainability of the communication device 11. The usefulness of the tire 1 is thus improved.

In the tire 1 according to an embodiment of the present disclosure, preferably, the communication device 11 is embedded at a position that is outward in the tire radial direction from the inner surface of the maximum width belt layer 7C in the belt 7. With this structure, the belt 7 is less likely to hinder embedding the communication device 11 in the tire 1 or extracting the communication device 11 from the tire 1 during retreading of the tire 1.

In the tire 1 according to an embodiment of the present disclosure, preferably, the communication device 11 is embedded at a position that is inward in the tire radial direction from the outer surface of the outermost belt layer 7A in the belt 7. With this structure, the communication device 11 is less likely to be damaged during retreading of the tire 1.

In the tire 1 according to an embodiment of the present disclosure, preferably, the communication device 11 is embedded at a position that is outward in the tire width direction from the maximum width belt layer 7C in the belt 7. With this structure, the communicability of the communication device 11 in both the tire radial direction and the tire width direction can be achieved.

In the tire 1 according to an embodiment of the present disclosure, preferably, the belt 7 is a non-metal belt. With this structure, a decrease in the communicability of the communication device 11 caused by embedding the communication device 11 near the belt 7 can be prevented.

The retreaded tire 1 according to an embodiment of the present disclosure comprises: the base tire 1A that includes the belt 7 composed of one or more belt layers 7A to 7D and is obtained as a result of removing a tire radial outer part from a position that is outward in the tire radial direction from the outer surface of the outermost belt layer 7A in the belt 7; the communication device 11 embedded in the base tire 1A at a position that is outward in the tire radial direction from the inner surface of the innermost belt layer 7D in the belt 7 and outward in the tire width direction from the minimum width belt layer 7A in the belt 7; and the tread member 1B adhered to the tire radial outer side of the base tire 1A, wherein the tire radial outer side of the communication device 11 is not covered with the belt 7. With this structure, when the retreaded tire 1 is retreaded again, the communication device 11 is not cut off, so that the communication device 11 can be continuously used. Moreover, when the retreaded tire 1 is retreaded again, the belt 7 is less likely to hinder embedding the communication device 11 in the retreaded tire 1 or extracting the communication device 11 from the retreaded tire 1. Furthermore, embedding the communication device 11 near the surface S of the base tire 1A on the tire radial outer side, which is exposed when the retreaded tire 1 is retreaded again, improves the maintainability of the communication device 11. The usefulness of the retreaded tire 1 is thus improved.

In the retreaded tire 1 according to an embodiment of the present disclosure, preferably, the communication device 11 is embedded in part of the annular rubber member 12 extending in the tire circumferential direction. With this structure, the communication device 11 can be stably placed in the base tire 1A during the production of the retreaded tire 1, with it being possible to improve the productivity of the retreaded tire 1.

The production method for the retreaded tire 1 according to an embodiment of the present disclosure is a retreaded tire production method of obtaining the retreaded tire 1 in which the communication device 11 is embedded, the retreaded tire production method comprising: removing, from the tire 1 including the belt 7 composed of one or more belt layers 7A to 7D, a tire radial outer part from a position that is outward in the tire radial direction from the outer surface of the outermost belt layer 7A in the belt 7 to produce the base tire 1A; installing the communication device 11 in the base tire 1A at a position that is outward in the tire radial direction from the inner surface of the innermost belt layer 7D in the belt 7 and outward in the tire width direction from the minimum width belt layer 7A in the belt 7 so that the tire radial outer side of the communication device 11 will not be covered with the belt 7; and adhering the tread member 1B to the base tire 1A from the tire radial outer side of the base tire 1A. With this structure, when the retreaded tire 1 is retreaded again, the communication device 11 is not cut off, so that the retreaded tire 1 in which the communication device 11 can be continuously used can be produced. Moreover, when the retreaded tire 1 is retreaded again, the belt 7 is less likely to hinder embedding the communication device 11 in the retreaded tire 1 or extracting the communication device 11 from the retreaded tire 1. Furthermore, embedding the communication device 11 near the surface S of the base tire 1A on the tire radial outer side, which is exposed when the retreaded tire 1 is retreaded again, improves the maintainability of the communication device 11. The usefulness of the retreaded tire 1 is thus improved.

In the production method for the retreaded tire 1 according to an embodiment of the present disclosure, preferably, the communication device 11 is embedded in part of the annular rubber member 12, and the installing of the communication device 11 includes winding the rubber member 12 around the base tire 1A from the tire radial outer side of the base tire 1A. With this structure, the communication device 11 can be stably placed in the base tire 1A during the production of the retreaded tire 1, with it being possible to improve the productivity of the retreaded tire 1.

While the presently disclosed techniques have been described above by way of embodiments and drawings, various changes and modifications can be made by those of ordinary skill in the art based on the present disclosure. Such changes and modifications are therefore included in the scope of the present disclosure. For example, the structures, functions, etc. included in each embodiment may be rearranged without logical inconsistency. The structures, functions, etc. included in each embodiment may be used in combination with any other embodiment, and a plurality of structures, functions, etc. may be combined into one structure, function, etc., one structure, function, etc. may be divided into a plurality of structures, functions, etc., or part of the structures, functions, etc. may be omitted.

REFERENCE SIGNS LIST 1 tire
1A base tire
1B tread member
2 bead portion
3 sidewall portion
4 tread portion
5 bead core
6 carcass
6A carcass body portion
6B carcass folded portion
7 belt
7A to 7D belt layer
8 bead filler
9 belt under-cushion rubber 10 circumferential main groove (main groove)
11 communication device
12 rubber member
CL tire equatorial plane
T tread surface
TE tread edge
S surface

The invention claimed is:

1. A retreaded tire comprising:
 a base tire that includes a belt composed of one or more belt layers and is obtained as a result of removing a tire radial outer part from a position that is outward in a tire radial direction from an outer surface of an outermost belt layer in the belt;
 an annular rubber member embedded in the base tire and extending in a tire circumferential direction;
 a communication device embedded in part of the annular rubber member at a position that is outward in the tire radial direction from an inner surface of an innermost belt layer in the belt and outward in a tire width direction from a minimum width belt layer in the belt; and
 a tread member adhered to a tire radial outer side of the base tire,
 wherein a tire radial outer side of the communication device is not covered with the belt,
 the annular rubber member is placed between the base tire and the tread member, and
 the annular rubber member is formed from a rubber material having lower carbon content and higher conductivity than a rubber material of the base tire located around the annular rubber member.

2. The retreaded tire according to claim 1, wherein the annular rubber member is in contact with both the base tire and the tread member.

3. A retreaded tire production method of obtaining the retreaded tire according to claim 1, the retreaded tire production method comprising:
 removing, from a tire including a belt composed of one or more belt layers, a tire radial outer part from a position that is outward in a tire radial direction from an outer surface of an outermost belt layer in the belt to produce a base tire;
 installing a communication device in the base tire at a position that is outward in the tire radial direction from an inner surface of an innermost belt layer in the belt and outward in a tire width direction from a minimum width belt layer in the belt so that a tire radial outer side of the communication device will not be covered with the belt, the communication device being embedded in part of an annular rubber member extending in a tire circumferential direction; and
 adhering a tread member to the base tire from a tire radial outer side of the base tire thereby placing the annular rubber member between the base tire and the tread member, wherein
 the installing of the communication device includes winding the annular rubber member around the base tire from the tire radial outer side of the base tire, and
 the annular rubber member is formed from a rubber material having lower carbon content and higher conductivity than a rubber material of the base tire located around the annular rubber member.

\* \* \* \* \*